United States Patent [19]

Sellers

[11] 4,314,373
[45] Feb. 2, 1982

[54] PASSIVE TRANSMITTER INCLUDING PARAMETRIC DEVICE

[75] Inventor: Robert W. Sellers, Palm Bay, Fla.

[73] Assignee: Harris Corporation, Cleveland, Ohio

[21] Appl. No.: 118,757

[22] Filed: Feb. 5, 1980

Related U.S. Application Data

[63] Continuation of Ser. No. 689,090, May 24, 1976, abandoned.

[51] Int. Cl.³ .............................................. H04B 1/50
[52] U.S. Cl. ........................................ 455/73; 455/20;
340/539; 343/6.5 SS
[58] Field of Search ............................ 455/19, 20–22,
455/106, 73, 78, 80; 343/6.5 R, 6.5 SS;
340/539, 568, 571, 572

[56] References Cited

U.S. PATENT DOCUMENTS

| 2,607,004 | 8/1952 | Harris | 455/20 |
| 2,851,592 | 9/1958 | Webster, Jr. | 455/19 |
| 3,172,101 | 3/1965 | Kingsford-Smith | 343/6.5 SS |
| 3,182,314 | 5/1965 | Kleist et al. | 343/6.5 SS |
| 3,182,315 | 5/1965 | Sweeney | 343/6.5 SS |
| 3,609,741 | 9/1971 | Miller | 455/20 |
| 4,019,181 | 4/1977 | Olsson et al. | 343/6.5 SS |

Primary Examiner—Jin F. Ng
Attorney, Agent, or Firm—Yount & Tarolli

[57] ABSTRACT

A passive transmitter incorporates a parametric device, e.g. a varactor diode. A tuned circuit derives energy received from a source of radiowaves, and is coupled to pump the varactor diode. The varactor diode produces a subharmonic output. Means are coupled to the varactor diode to modulate the subharmonic signal, and the modulated subharmonic output may be transmitted without amplification.

4 Claims, 3 Drawing Figures

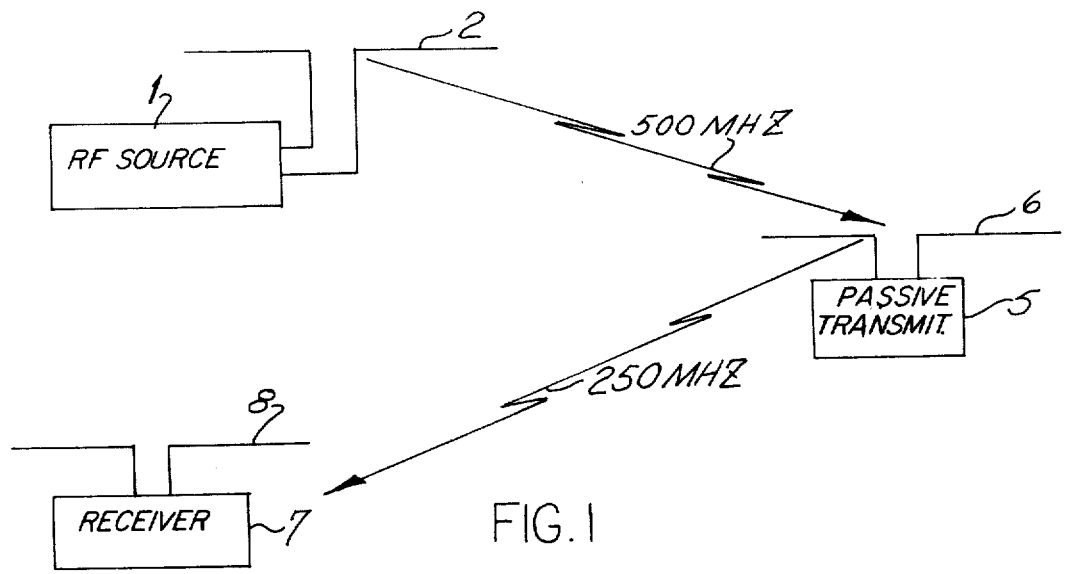
FIG.1
FIG 2
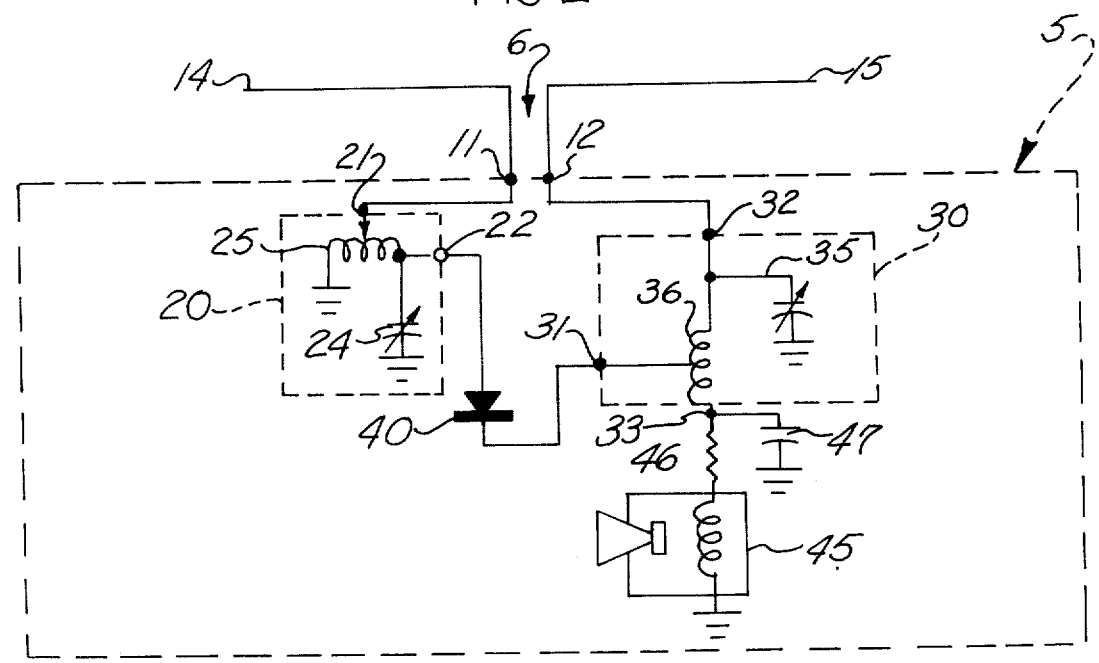
FIG.3
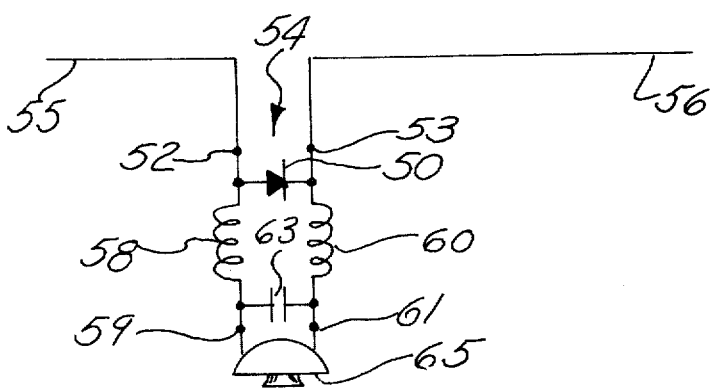

PASSIVE TRANSMITTER INCLUDING PARAMETRIC DEVICE

This is a continuation of application Ser. No. 689,090 filed May 24, 1976, now abandoned.

BACKGROUND OF THE INVENTION

This invention relates to passive transmitters, and more particularly to a passive transmitter incorporating a parametric device.

Parametric devices are used in frequency multipliers and dividers, and generally require a local source of power providing an input to a parametric device at a first or pump frequency. It is important that a passive transmitter include a limited number of stages since very limited power, namely power derived from an external source, is available for operation. It is desirable to provide a passive transmitter which does not include a local amplifier and yet which can produce a usable output signal. It is also desirable to provide modulation means in a passive transmitter so the passive transmitter can produce output signals bearing information. Further, parametric amplifiers often require idler circuits which are necessary to provide a signal circulation path for frequencies such as the frequency corresponding to the difference between the pump frequency and the output frequency. If an idler circuit can be eliminated, simplicity of a passive transmitter is enhanced.

SUMMARY OF THE INVENTION

It is therefore an object of the present invention to provide a passive transmitter providing an output frequency provided from a parametric device, which parametric device is pumped by energy derived from a received radio signal.

It is also an object of the present invention to provide a passive transmitter in which a parametric device is pumped by a received radio signal, and in which a subharmonic frequency produced by the parametric device is modulated and reradiated without further amplification by means coupled to the parametric device.

It is also an object of the present invention to provide a passive transmitter employing a parametric circuit in which an idler circuit is not required.

Briefly stated, in accordance with the present invention, there is provided a passive transmitter in which means are provided for receiving a first radio signal at a pump frequency in response to transmissions from a source. A parametric device is connected to the receiving means and is pumped by energy at the pump frequency. The parametric device produces a subharmonic output. Modulation means are connected to the output of the parametric device to modulate the output thereof, and the modulated output is connected to transmitting means. The same antenna may be utilized to receive the first radio signal and to radiate the modulated output.

BRIEF DESCRIPTION OF THE DRAWINGS

The means by which the foregoing objects and features of invention are achieved are pointed out with particularity in the claims forming the concluding portion of the specification. The invention, both as to its organization and manner of operation may be further understood by reference to the following description taken in connection with the following drawings.

Of the drawings:

FIG. 1 is a block diagramatic representation of a system utilizing a passive transmitter constructed in accordance with the present invention;

FIG. 2 is a schematic representation of one form of the present invention; and

FIG. 3 is a schematic representation of a further embodiment of the present invention.

DESCRIPTION OF THE PREFERRED EMBODIMENTS

FIG. 1 is a block diagramatic illustration of a system employing a passive transmitter constructed in accordance with the present invention. A radio frequency source 1 is provided and includes an antenna 2. The radio frequency source 1 produces a first radio signal at a frequency F which may be, for example, 500 MHz. A passive transmitter 5 constructed as described below receives the first radio signal, and utilizes the energy derived therefrom as a source. The passive transmitter 5 is coupled to an antenna 6, which in the preferred embodiment both receives the first radio signal and transmits an output signal. Transmitter output signals from the passive transmitter 5 are received by a receiver 7 having an antenna 8 preferably tuned to the output frequency of the passive transmitter 5.

FIG. 2 is a schematic illustration of one form of passive transmitter 5 that may be utilized in the system of FIG. 1. In a manner described below, the passive transmitter 5 receives an input signal at a frequency F and provides an output at a subharmonic output frequency F/2. No local signal source is required in the passive transmitter 5 to accomplish the frequency conversion. The passive transmitter 5 has first and second terminals 11 and 12. Exterior connections from the terminals 11 and 12 are made respectively to first and second legs 14 and 15 of the antenna 6. The antenna 6 may comprise a half-wave length dipole or other well-known suitable form of antenna. In order to derive energy from the first radio signal, a tuned circuit 20 is provided having an input terminal 21 and an output terminal 22. The tuned circuit 20 is a conventional parallel resonant circuit, and comprises means for receiving the first radio signal and for providing a pump signal at a frequency F at the output terminal 22. A capacitor 24 and an inductor 25 are connected in parallel between the output terminal 22 and ground (or other level of references potential). The input terminal 21 is connected to a tap on the inductor 25. A second tuned circuit 30 is provided for transmitting the subharmonic frequency F/2 and comprises output means having an input terminal 31, an output terminal 32, and a modulation input terminal 33. A capacitor 35 is connected between the output terminal 32 and ground. An inductor 36 is connected between the output terminal 32 and the modulation input terminal 33. While both the capacitors 35 and 24 are illustrated in FIG. 2 as being variable, this representation is utilized to suggest the tunability of the tuned circuits 20 and 30. However, suitable fixed capacitors 24 and 30 may be provided.

A parametric means or device 40 is connected to be pumped from the first tuned circuit 20 and provide an output to the second tuned circuit 30. The parametric device 40 may conveniently comprise a well-known varactor diode 40 having its anode connected to the terminal 22 and its cathode connected to the terminal 31. Since a varactor diode may also be considered to be a voltage variable capacitor, one varactor diode suitable for use at the frequencies discussed in conjunction with the present embodiment may be specified as a varactor diode having a capacitance C of 0.33pf at 6 volts. The output of the varactor diode appears at the terminal 31.

In order to modulate the output of the varactor diode 40, modulation means 45 are provided coupled between the modulation input terminal 33 and ground. A coupling resistor 46 is connected in a series between the modulation means 45 and the modulation input terminal 33, and a capacitor 47 is connected between the modulation input terminal 33 and ground for filtering noise peaks.

In operation, the first radio signal at the frequency F is received from the source 1 (FIG. 1) and is provided across the terminals 11 and 12 of the antenna 6. The tuned circuit 20 is tuned to the frequency F and provides output energy at the terminal 22. The received energy at the terminal 22 pumps the varactor diode 40. In accordance with well-known theory, the parametric device, i.e. varactor diode 40, so pumpted produces oscillations at subharmonics of the frequency F. The subharmonic of greatest magnitude is the subharmonic having the frequency F/2. Since the tuned circuit 30 is tuned to the frequency F/2, the tuned circuit 30 acts as output means coupled to the varactor diode 40 for transmitting the output thereof. Since the modulation means 45 produces a variable reactance in response to information, an information signal is modulated on the output appearing at the terminal 32 of the tuned circuit 20. While information inputs to the modulation means 45 cause both alterations of the phase and amplitude of the output at the terminal 32, the alteration is such that what is commonly recognized to be good quality information reception may be obtained utilizing a conventional amplitude modulation receiver to detect the output of the passive transmitter 5. The output radio signal of the parametric device 40 thus modulated is radiated by the dipole 6.

FIG. 3 is a schematic representation of a further embodiment in which legs of a dipole antenna each form part of a tuned circuit. In FIG. 3 a parametric device 50, which may also be a varactor diode is coupled across terminals 52 and 53. An antenna 54 is provided having a first leg 55 connected to the terminal 52 and a second leg 56 connected to the terminal 53. In order to provide an input tuned circuit, a first radio frequency choke 58 is connected between the terminal 52 and a terminal 59. An output tuned circuit is formed with the leg 56 of the antenna 54 by connecting a radio frequency choke 60 between the terminal 53 and a terminal 61. A noise filtering capacitor 63 and modulation means 65 are each connected across the terminals 59 and 61. The leg 55 is tuned to a length L/4 where L is the wavelength corresponding to the frequency F. In this manner the leg 55 and choke 58 form a first tuned circuit 68 tuned to the frequency F. A second tuned circuit 69 comprising an output tuned circuit consisting of the choke 60 and antenna leg 56 is formed by tuning the antenna leg 56 to a length L/2. In other words, the leg 56 is resonant at the first subharmonic of the frequency F. In operation, the varactor diode 50 is pumped by energy received from the tuned circuit 68 and produces subharmonics at the resonant frequency of the tuned circuit 69. The tuned circuit 69 provides an output which is modulated by the modulation means 65.

What is thus provided is a greatly simplified passive transmitter in which an output signal is provided without amplification within the passive transmitter. A simplified parametric oscillator is provided. Since the subharmonic produced by the parametric device 40 is directly utilized, no separate signal source is required in frequency conversion circuitry. Additionally, the frequency conversion circuitry does not require the use of an idler circuit. A transmitter is provided in which a received signal pumps a parametric device and a modulated subharmonic is reradiated without further amplification. The same antenna which receives the first radio signal may radiate the output radio signal. In one embodiment, legs of an antenna may actually comprise portions of the tuned circuitry to provide a further simplified passive transmitter. Of course it will be realized by those skilled in the art that many modifications may be made to the specific circuitry disclosed herein to provide a passive radio transmitter constructed in accordance with the present invention.

What is claimed is new and desired to be secured by Letters Patent of the United States:

1. A passive radio transmitter comprising: means for receiving a first radio signal, said receiving means including a first tuned circuit, tuned to a frequency F and connected to receive the first radio signal where F is the frequency of the first radio signal; parametric means coupled to said receiving means and pumped by the first radio signal, whereby said parametric means provides a subharmonic output; output means coupled to the output of said parametric means for transmitting the output thereof, said output means including a second tuned circuit tuned to a frequency F/2; modulating means coupled to said second tuned circuit for modulating the output thereof in accordance with an information signal, whereby a modulated output may be provided from said output means; and a dipole antenna having first and second terminals, wherein said first tuned circuit includes an input terminal connected to said first terminal of said antenna and said second tuned circuit includes an output terminal coupled to said second terminal of said antenna such that said first tuned circuit, parametric means, and second tuned circuit are connected in series between said first and second terminals of said antenna.

2. A passive radio transmitter comprising: means for receiving a first radio signal; parametric means coupled to said receiving means and pumped by the first radio signal, whereby said parametric means provides a subharmonic output; output means coupled to the output of said parametric means for transmitting the output thereof; and modulating means coupled to the output of said parametric means for modulating the output thereof in accordance with an information signal, whereby a modulating output may be provided from said output means, wherein said receiving means comprises a first leg of a dipole antenna and a first radio frequency choke connected in series to form a first tuned circuit, and wherein said output means comprises a second leg of a dipole antenna and a second radio frequency choke to form a second tuned circuit, said first and second tuned circuits being tuned to frequencies of F and F/2 respectively, where F is the frequency of the first radio signal.

3. A passive radio transmitter as set forth in claim 2, wherein said second leg of dipole antenna is twice the length of said first leg.

4. A passive radio transmitter comprising a dipole antenna for receiving and transmitting radio signals and having first and second legs, a varactor diode connected between said first and second dipole legs, and a circuit connected in parallel with said varactor diode, said circuit including first and second RF chokes connected in series with one another through a parallel-connected combination of capacitor and modulating means, where said circuit is connected across said diode such that said first RF choke is connected to said first dipole leg to form a first tuned circuit and said second RF choke is connected to said second dipole leg to form a second tuned circuit, said first and second tuned circuits being tuned to frequencies of F and F/2 respectively, where F is the frequency of the radio signal said passive radio transmitter is intended to receive via said dipole antenna and be energized by, and F/2 is the frequency of the radio signal generated by the varactor diode in response to the received radio signal, modulated by the modulating means, and transmitted via said dipole antenna.

* * * * *